(12) United States Patent
Stephenson et al.

(10) Patent No.: US 6,690,447 B1
(45) Date of Patent: *Feb. 10, 2004

(54) LIQUID-CRYSTAL DISPLAY COMPRISING A DIELECTRIC LAYER BETWEEN ELECTRODES AND METHODS FOR MAKING THE SAME

(75) Inventors: Stanley W. Stephenson, Spencerport, NY (US); John I. Kilburn, Hilton, NY (US); John W. Boettcher, Webster, NY (US); Thomas M. Smith, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 09/915,441

(22) Filed: Jul. 26, 2001

(51) Int. Cl.[7] ............... G02F 1/13; G02F 1/1333; C09K 19/52

(52) U.S. Cl. ............... 349/187; 349/86; 349/88; 252/299.01

(58) Field of Search ............... 349/187, 86, 88; 252/299.01

(56) References Cited

U.S. PATENT DOCUMENTS

| | | | |
|---|---|---|---|
| 4,802,742 A | * | 2/1989 | Ichikawa et al. ........... 349/122 |
| 2003/0002132 A1 | * | 1/2003 | Foucher et al. ............ 359/296 |
| 2003/0011868 A1 | * | 1/2003 | Zehner et al. ............ 359/296 |

* cited by examiner

Primary Examiner—Tarifur R. Chowdhury
(74) Attorney, Agent, or Firm—Raymond L. Owens; Chris P. Konkol

(57) ABSTRACT

A method of making a liquid crystal display, comprising the steps of: providing a substrate; providing a first electrode over the substrate; coating the first electrode with aqueous dispersed material which when dried provides a dielectric layer over the first electrode; coating the dielectric layer with liquid crystal bearing material and drying such liquid crystal bearing material and providing a second electrode in contact with the dried liquid crystal bearing material.

14 Claims, 7 Drawing Sheets

LIQUID-CRYSTAL DISPLAY COMPRISING A DIELECTRIC LAYER BETWEEN ELECTRODES AND METHODS FOR MAKING THE SAME

CROSS REFERENCE TO RELATED APPLICATIONS

Reference is made to commonly assigned U.S. patent application Ser. No. 09/379,776, filed Aug. 24, 1999 entitled "Forming A Display Having Conductive Image Areas Over A Light Modulating Layer" by Dwight J. Petruchik et al., U.S. patent application Ser. No. 09/723,389, filed Nov. 28, 2000, entitled "Unipolar Drive for Cholesteric Liquid Crystal Displays" by David M. Johnson et al., U.S. patent application Ser. No. 09/915,831, filed Jul. 26, 2001, entitled "Method of Making Liquid Crystal Display Having a Dielectric Adhesive Layer for Laminating a Liquid Crystal Layer" by Smith et al and U.S. patent application Ser. No. 09/915,614, filed Jul. 26, 2001, entitled "Making a Liquid Crystal Display Using Heat and Pressure Lamination of Liquid Crystal Coating" by Smith et al, the disclosures of which are incorporated herein by reference.

FIELD OF THE INVENTION

The present invention relates to providing a dielectric layer for polymer dispersed liquid crystal displays.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

A structure is disclosed in PCT/WO 97/04398, entitled "Electronic Book With Multiple Display Pages" which is a thorough recitation of the art of thin, electronically written display technologies. Disclosed is the assembling of multiple display sheets that are bound into a "book", each sheet is arranged to be individually addressed. The patent recites prior art in forming thin, electronically written pages, including flexible sheets, image modulating material formed from a bi-stable liquid crystal system, and thin metallic conductor lines on each page.

Fabrication of flexible, electronically written display sheets are disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operate on the liquid crystal material to expose display areas. The display uses nematic liquid crystal material which ceases to present an image when de-energized.

U.S. Pat. No. 5,223,959 discloses a plurality of polymer dispersed liquid crystal material, each having a different dye material of red, green or blue dye material. Differing electrical signals to common electrodes operate on each of the materials to control the state of each type of dyed liquid crystal material. The patent requires the use of conventional nematic liquid crystals with a dye to absorb light. The droplets are chemically treated to be stable in either a clear or a light absorbing state. The invention also requires materials having different response times to electrical signals. The device must be continually driven so that the human eye perceives complementary colors. This arrangement has the disadvantage of requiring continuous, high speed electrical drive because the materials do not maintain their state. The material must be driven to achieve a neutral color density.

U.S. Pat. No. 5,437,811 discloses a light-modulating cell having a polymer dispersed chiral nematic liquid crystal. The chiral nematic liquid crystal has the property of being driven between a planar state reflecting a specific visible wavelength of light and a light scattering focal-conic state. Said structure has the capacity of maintaining one of the given states in the absence of an electric field.

U.S. Pat. No. 3,816,786 discloses droplets of cholesteric liquid crystal in a polymer matrix responsive to an electric field. The electrodes in the patent can be transparent or non-transparent and formed of various metals or graphite. It is disclosed that one electrode must be light absorbing and it is suggested that the light absorbing electrode be prepared from paints contains conductive material such as carbon.

U.S. Pat. No. 5,289,300 discusses forming a conductive layer over a liquid crystal coating to form a second conductor. The description of the preferred embodiment discloses Indium-Tin-Oxide (ITO) over a liquid crystal dispersion to create a transparent electrode.

Prior art discloses the use of dielectric barrier layers formed over ITO conductors. The dielectric layer protects the ITO transparent conductor from damage from electrochemical interaction with the light modulating material. The protective layers are typically formed by vacuum sputtering silicon dioxide over the ITO conductors. The vacuum forming process is slow and expensive.

SUMMARY OF THE INVENTION

It is an object of this invention to provide a highly effective dielectric coating over electrodes used in polymer dispersed liquid crystal displays.

This object is achieved in a method of making a liquid crystal display, comprising the steps of:

(a) providing a substrate;

(b) providing a first electrode over the substrate;

(c) coating the first electrode with aqueous dispersed material which when dried provides a dielectric layer over the first electrode;

(d) coating the dielectric layer with liquid crystal bearing material and drying such liquid crystal bearing material; and (e) providing a second electrode in contact with the dried liquid crystal bearing material.

The invention provides an inexpensive dielectric layer between field carrying electrodes in displays that are aqueous coated. Such dielectric layers provide a good bond between the aqueous suspension and the ITO on a flexible substrate.

The present invention provides a dielectric layer over a conductive layer using simple, inexpensive aqueous coatings. Such coatings permit the fabrication of electronic privacy screens having long life and durability. The aqueous dielectric coating significantly improves yields of cholesteric memory displays having electrical electrodes applied over a polymer dispersed liquid crystal layer.

DETAILED DESCRIPTION OF THE PREFERRED EMBODIMENT

Figure 1:
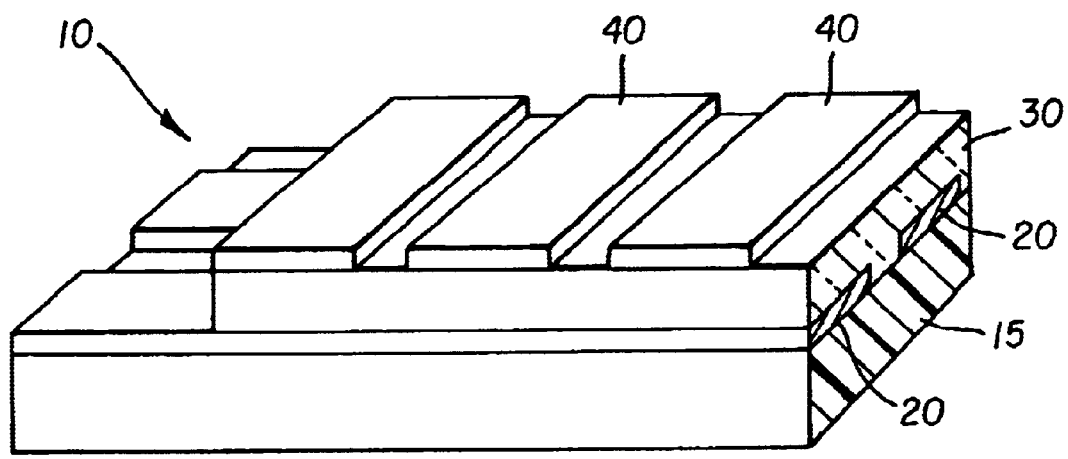
FIG. 1 is a sectional view of a sheet having a coated liquid crystal in accordance with the present invention.

FIG. 1 is an isometric partial view of a new structure for a medium shown as a sheet 10 made in accordance with the invention. It will be understood that other forms of media such as a more permanent display can also be used in accordance with the present invention. Sheet 10 includes a flexible substrate 15, which is a thin transparent polymeric material, such as Kodak Estar film base formed of polyester plastic that has a thickness of between 20 and 200 microns. In an exemplary embodiment, substrate 15 can be a 125-micron thick sheet of polyester film base. Other polymers, such as transparent polycarbonate, can also be used.

First electrode 20 is formed over substrate 15. First electrode 20 can be Tin-Oxide or Indium-Tin-Oxide (ITO), with ITO being the preferred material. Typically the material of first electrode 20 is sputtered as a layer over substrate 15 having a resistance of less than 250 ohms per square. In certain applications, the sputtered layer is patterned in any well known manner. Alternatively, first electrode 20 can be an opaque electrical electrode material such as copper, aluminum or nickel. If first electrode 20 is an opaque metal, the metal can be a metal oxide to create light absorbing first electrode 20. First electrode 20 can be patterned by conventional lithographic or laser etching means.

A light modulating layer 30 which preferably is a polymer dispersed liquid crystal layer overlays first patterned electrodes 20. In a first case, the liquid crystal material is a nematic liquid crystal. Cholesteric liquid crystal materials can be Merck BL12, BL48, available from EM Industries of Hawthorne, N.Y. Such materials have high anisotropy indices of diffraction, which can act as a light diffusing surface in the absence of an electric field and as a transparent sheet 10 in the presence of an electric field.

In a second case the liquid crystal is a cholesteric liquid crystal, having peak reflection from the infrared through the visible spectrum. Application of electrical fields of various intensities and duration can drive a chiral nematic material (cholesteric) into a reflective, a transmissive state or an intermediate state. These materials have the advantage of maintaining a given state indefinitely after the field is removed. Cholesteric liquid crystal materials can be Merck BL112, BL118 or BL126, available from EM Industries of Hawthorne, N.Y.

Second electrode 40 is formed over light modulating layer 30. Second electrode 40 should have sufficient conductivity to carry a field light modulating layer 30. Second electrode 40 can be formed in a vacuum environment using materials such as Aluminum, Tin, Silver, Platinum, carbon, Tungsten, Molybdenum, Tin or Indium or combinations thereof. Oxides of said metals can be used provide a dark second electrode 40. The metal material can be excited by energy from resistance heating, cathode arc, electron beam, sputtering or magnetron excitation. Tin-Oxide or Indium-Tin Oxide coatings permit second electrode 40 to be transparent.

Alternatively, second electrode 40 can be printed conductive ink such as Electrodag 423SS screen printable electrical conductive material from Acheson Corporation. Such printed materials are finely divided graphite particles in a thermoplastic resin. In the preferred embodiment, second electrode 40 is formed using printable ink electrodes to produce a low cost display. The use of a flexible support for substrate 15, laser etching to pattern first electrode 20, machine coating light modulating layer 30 and printing second electrode 40 permits the fabrication of very low cost display sheets having memory.

Figure 2:
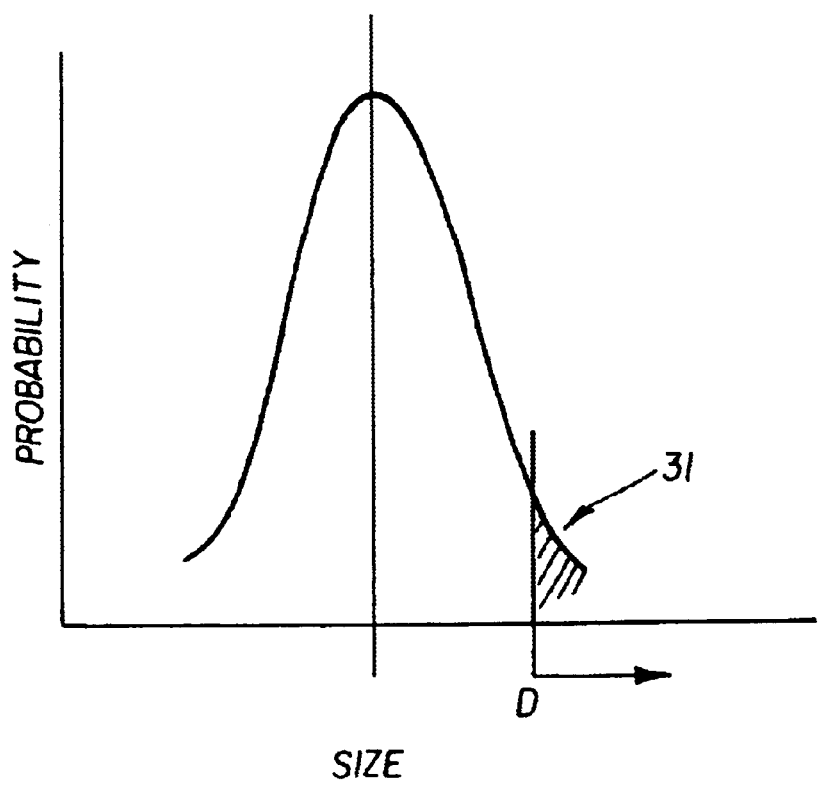
FIG. 2 is a plot of a distribution of domain size for aqueous dispersed liquid crystal.

The dispersion of liquid crystals in aqueous suspension is done in any conventional manner. One method is to disperse liquid crystal oils in deionized water containing dissolved gelatin. Other water soluble binders such as polyvinyl alcohol (PVA) or polyethylene oxide (PEO) can be used. Such compounds are machine coatable on equipment associated with photographic films. FIG. 2 is a plot of the dispersions of domain size for a liquid crystal oil in aqueous suspension. The oil domains have a size distribution around a mean diameter. A certain number are above a certain diameter D, and are called oversized domains 31.

Figure 3A:
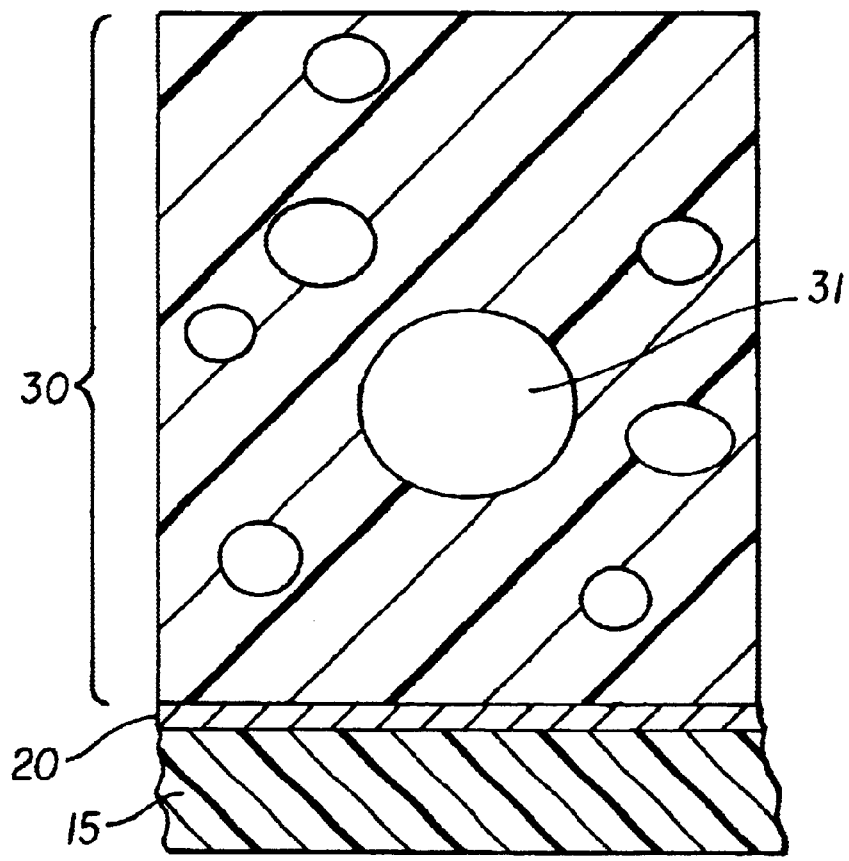
FIG. 3A is a sectional view a sheet having a coated emulsion before drying.
Figure 3B:
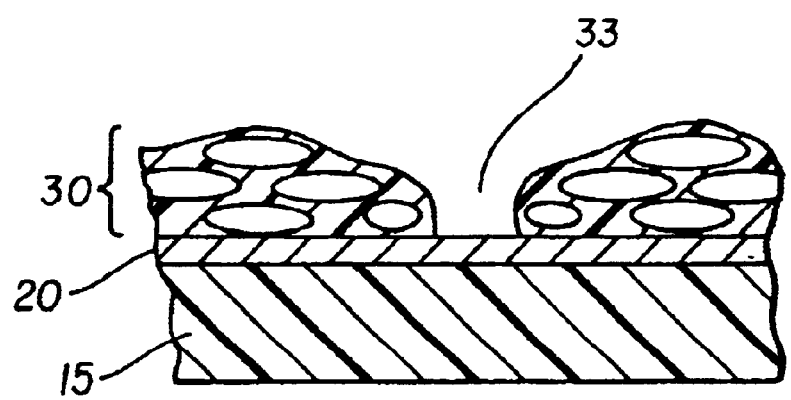
FIG. 3B is a sectional view of a sheet having a coated emulsion after drying.

FIG. 3A is a section view of a typical liquid crystal oil dispersed in water coated over first electrode 20 and containing oversized liquid crystal oil domains 31. Such coatings are dried to remove water from the suspension. FIG. 3B is a section view of the dried coating. The liquid crystal material is encapsulated by the water-soluble binder to create a pressure light modulating layer 30. Oversize oil domains 31 can be significantly larger in diameter than the dry thickness of polymer dispersed liquid crystal layer 30. Oversized oil domains 31 create coating defects 33 in the dried light modulating layer 30.

Figure 4A:
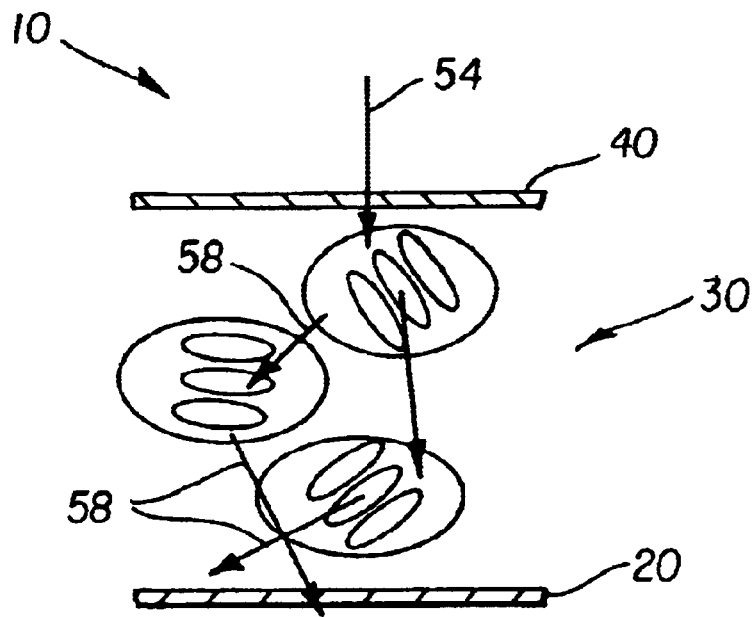
FIG. 4A is a sectional view of a nematic liquid crystal without an applied electric field.
Figure 4B:
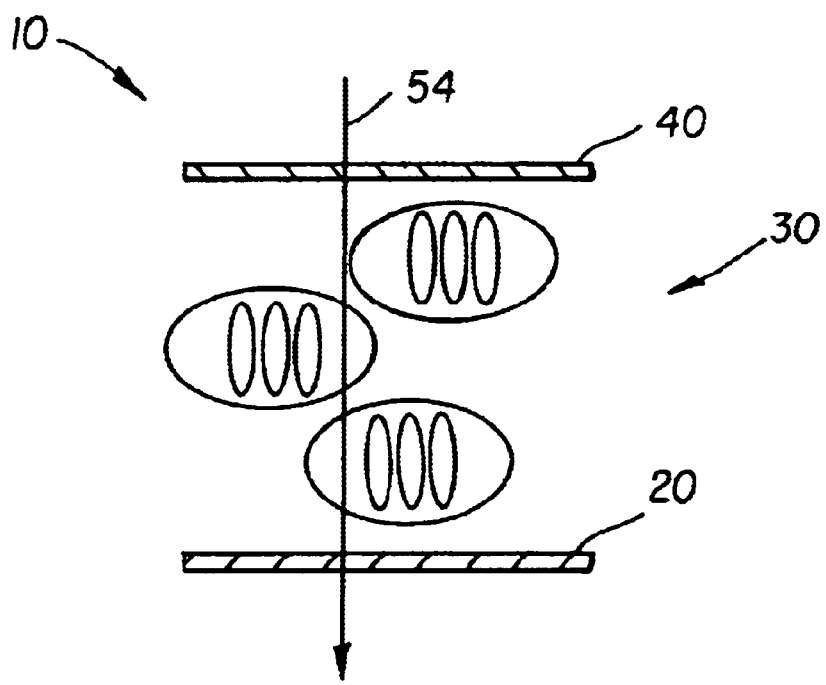
FIG. 4B is a sectional view of a nematic liquid crystal with an applied electric field.

FIG. 4A is a sectional view of a first, privacy light modulating layer 30, which is a nematic liquid crystal material having high optical anisotropy. It has been found that 2-micron diameter domains of the liquid crystal in aqueous suspension converts incident light 54 into scattered light 58 in the absence of an electric field. In this case, polymer dispersed liquid crystal layer 30 within sheet 10 can be used as a privacy screen. The material is further provided with first electrode 20 and second electrode 40 on either side of polymer dispersed liquid crystal layer 30 so that an electrical field can be applied across the material. FIG. 4B is a sectional view of polymer dispersed liquid crystal layer 30 with an electrical field applied. Liquid crystal material within each domain is aligned by the electrical field, and sheet 10 will becomes transparent. Electrically switching between the light scattering and transparent state using an electric field provides an electrically switched privacy screen.

Figure 5A:
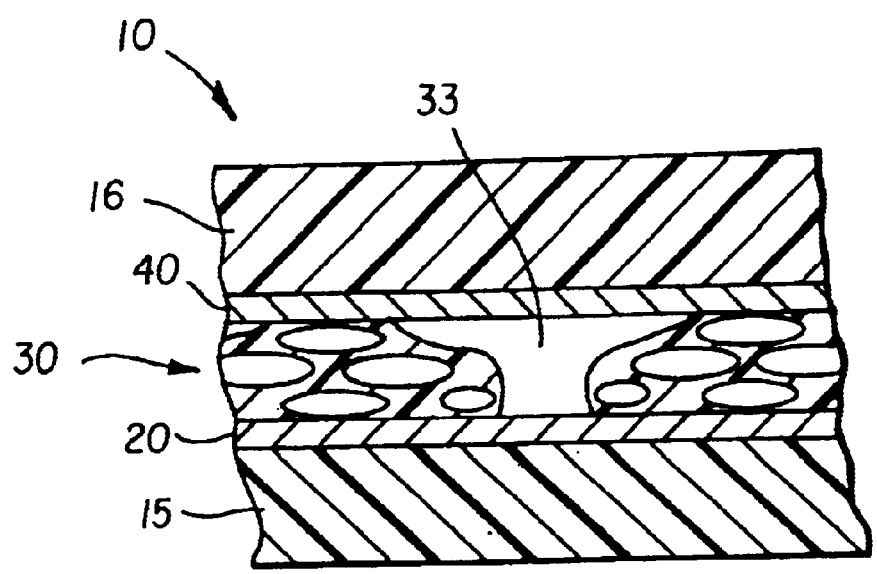
FIG. 5A is a display sheet having a laminated second electrode in accordance with prior art.

FIG. 5A is a sectional view of a privacy screen sheet 10 built in accordance with prior art. A second substrate 16, having second electrode 40 is bonded to a substrate 15 having a first electrode 20 and a light modulating layer 30. One method of bonding the two sheets of the privacy screens is to provide heat and pressure to bond second electrode 40 to light modulating layer 30. Coating defect 33 creates an air filled cavity in sheet 10. When sheets 10, formulated for privacy screen window application, are manufactured and a field is applied, liquid crystals in light modulating layer 30 begins to permanently align in the transparent state, even in the absence of a field.

Figure 5B:
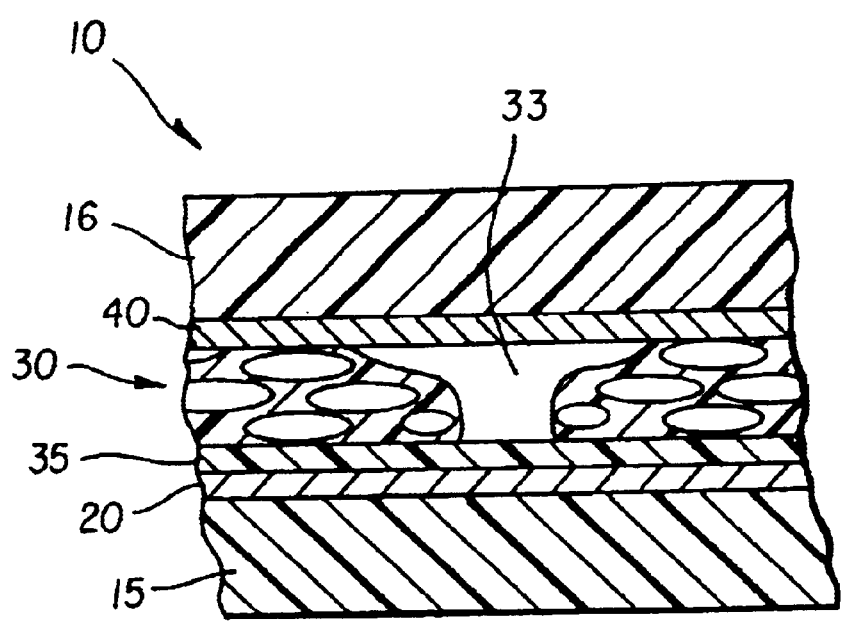
FIG. 5B is a display sheet having a laminated second electrode in accordance with a first embodiment of this invention.

FIG. 5B is a sectional view of a sheet 10 built in accordance with the current invention. A protective layer 35 is aqueous coated over first electrode 20. The dielectric layer was created by coating a 1.3% deionized gelatin solution at a rate of 0.38 cc per square meter. The resulting coating was about 0.5 microns thick. An emulsion of high anisotropy liquid crystal in a gel-water solution was coated over an ITO coated sheet of polyester. A second polyester sheet, also having an ITO coated surface was heat bonded over the dried light modulating layer 30. The liquid crystal material in experimental sheet 10 did not begin to align in the direction of the electrical field after several weeks of application of an electrical field. It is believed that the gelatin dielectric layer acts to prevent alignment of the liquid crystal material with the gelatin encapsulated domain.

Figure 5C:
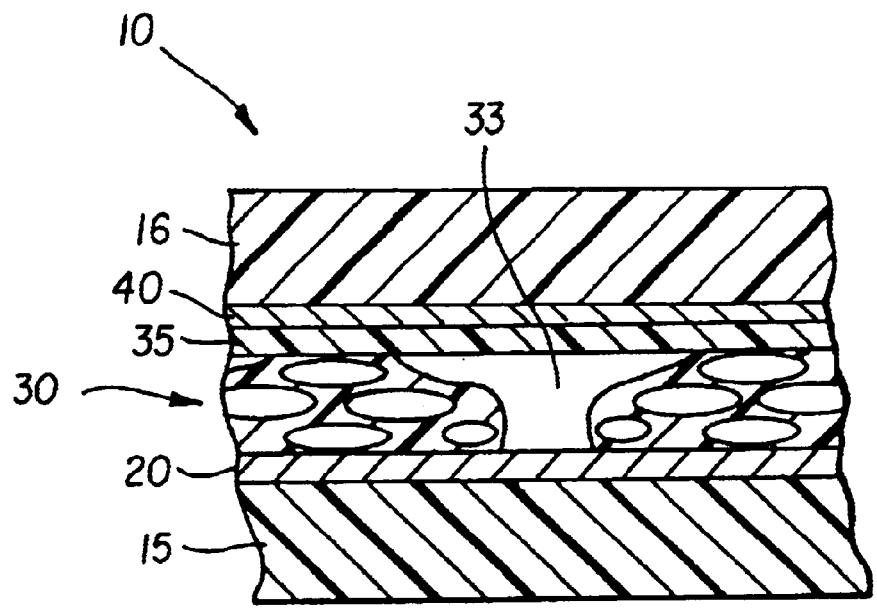
FIG. 5C is a display sheet having a laminated second electrode in accordance with a second embodiment of this invention.
Figure 5D:
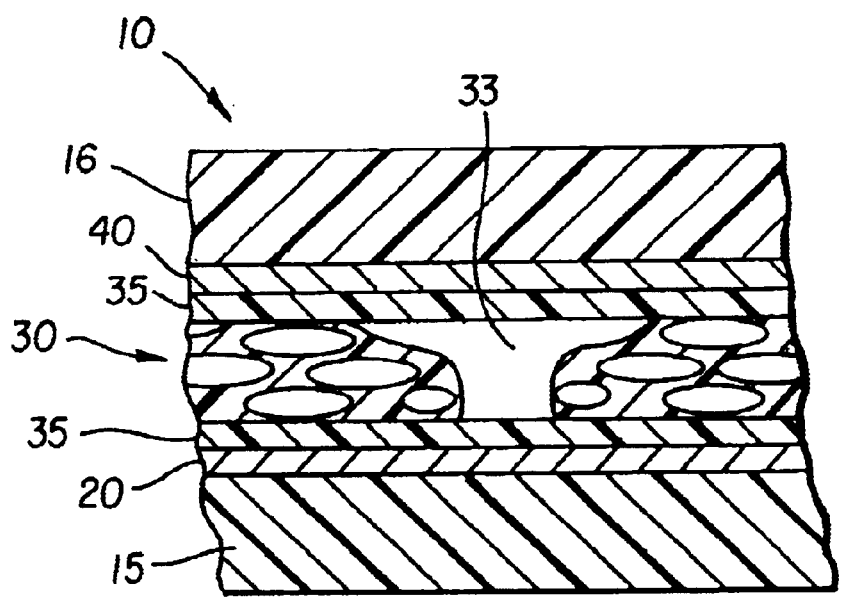
FIG. 5D is a display sheet having a laminated second electrode in accordance with a third embodiment of this invention.

Dielectric protective layers can be built in to sheet 10 in a variety of ways. FIG. 5C is a sectional view of sheet 10 fabricated by coating a solution of gelatin over second electrode 40 to create protective layer 35 instead of between first electrode 20 and light modulating layer 30. FIG. 5D is a sectional view of third embodiment. Protective layers 35 are coated over both first electrode 20 and second electrode 40 before assembly to provide a dielectric layer between both electrodes and light modulating layer 30. These configurations are effective in preventing liquid crystal material in polymer dispersion from taking permanent alignment to long term electrical fields.

Figure 6A:
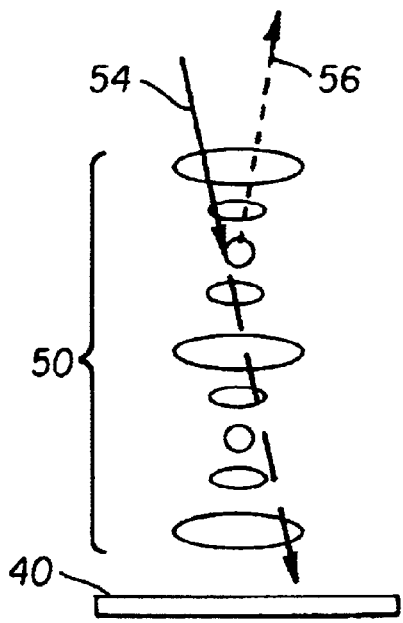
FIG. 6A is a view of the optical characteristics of a chiral nematic material in a planar state reflecting light.
Figure 6B:
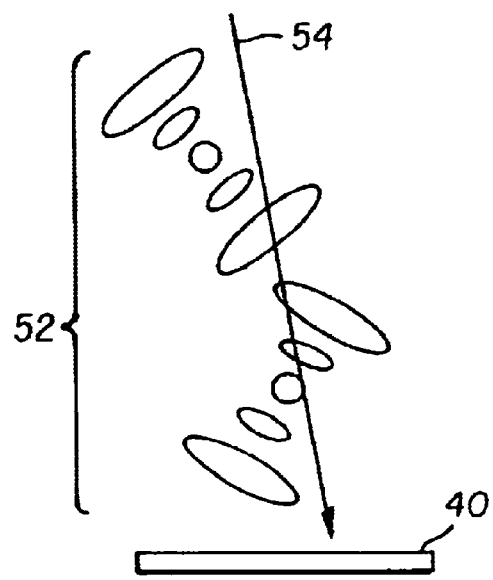
FIG. 6B is a view of the optical characteristics of a chiral nematic material in a focal-conic light diffusing state.

FIG. 6A and FIG. 6B show two stable states of cholesteric liquid crystals. In FIG. 6A, a high voltage field has been applied and quickly switched to zero potential, which converts cholesteric liquid crystal to a planar state 50. Incident light 54 striking cholesteric liquid crystal in planar state 50 is reflected as reflected light 56 to create a bright image. In FIG. 6B, application of a lower voltage field pulse leaves cholesteric liquid crystals in a transparent focal conic state 52. Incident light 54 passing through a cholesteric liquid crystal in focal conic state 52 is transmitted. Second patterned electrodes 40 can be black which will absorb incident light 54 to create a dark image when the liquid crystal material is in focal conic state 52. As a result, a viewer perceives a bright or dark image depending on if the cholesteric material is in planar state 50 or focal conic state 52, respectively.

Figure 7:
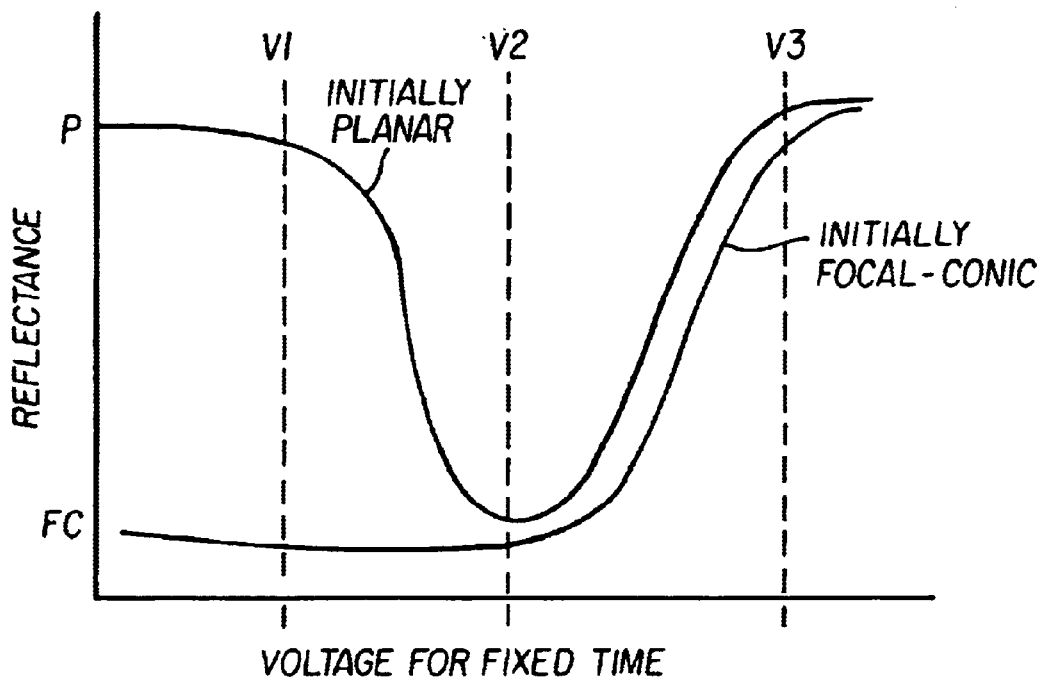
FIG. 7 is a plot of the response of a cholesteric to an electrical field of varying strength.

FIG. 7 is a plot of the response of a cholesteric material to a pulsed electrical field. Such curves can be found in U.S. Pat. Nos. 5,453,863 and 5,695,682. For a given pulse time, typically between 5 and 200 milliseconds, a pulse at a given voltage can change the optical state of a cholesteric liquid crystal. Voltage below disturbance voltage V1 can be applied without changing the state of the cholesteric material. A higher voltage pulse at a focal-conic voltage V2 will force a cholesteric material into the focal conic state 52. A voltage pulse at planar voltage V3 will force the cholesteric material into the planar state 50. The curve characteristic of cholesteric liquid crystal permits passive matrix writing of cholesteric displays.

Figure 8A:
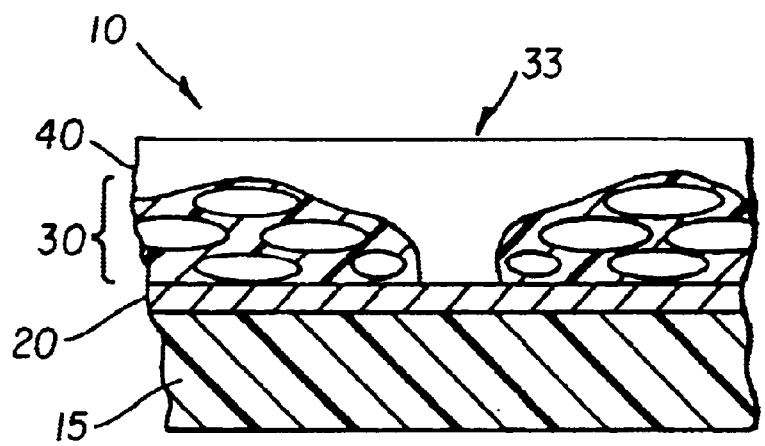
FIG. 8A is a display sheet having a coated second electrode in accordance with prior art.

FIG. 8A is a sectional view of a coated cholesteric display sheet 10. Substrate 15 supports a plurality of first electrodes 20. A cholesteric liquid is has been dispersed in a gelatin solution, coated and dried to create light modulating layer 30 over first electrodes 20. Second electrodes 40 are printed over light modulating layer 30 to provide a black, electrically electrodes that can be selectively energized to apply fields to the cholesteric liquid crystal in light modulating layer 30. Coating defects 33 in light modulating layer 30 causes electrical shorting between first electrodes 20 and second electrodes 40. Material adjacent to coating defect 33 cannot be switched between planar state 50 and focal-conic state 52.

Figure 8B:
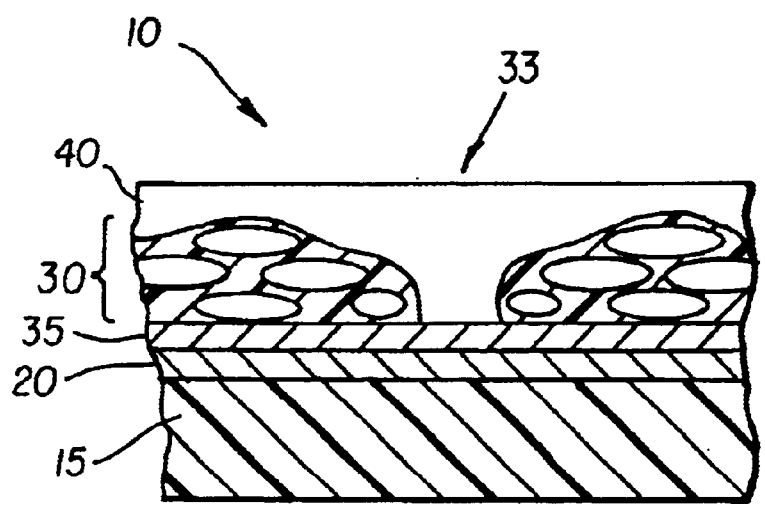
FIG. 8B is a display sheet having a coated second electrode in accordance with this invention.

FIG. 8B is a sectional view of an experimental sheet 10 formed in accordance with the present invention. A protective layer 35 is aqueous coated and dried over first electrode 20 prior to application of the aqueous light modulating layer 30. The dielectric layer was created by coating a 1.3% deionized gelatin solution at a rate of 0.38 cc per square meter. The resulting coating was about 0.5 microns thick. Sheet 10 assembled, incorporating protective layer 35 and electrically tested. The 0.5 micron thick protective layer was effective in preventing image defects due to coating and provides effective insulation between electrodes used in changing the state of cholesteric liquid crystals.

The invention has been described in detail with particular reference to certain preferred embodiments thereof, but it will be understood that variations and modifications can be effected within the spirit and scope of the invention.

PARTS LIST 10 sheet
15 substrate
16 second substrate
20 first electrode
30 light modulating layer
31 oversized domains
33 coating defect
35 protective layer
40 second electrode
50 planar liquid crystals
52 focal-conic liquid crystals
54 incident light
56 reflected light
58 scattered light
V1 disturbance voltage
V2 focal-conic voltage
V3 planar voltage

What is claimed is:

1. A method of making a liquid crystal display, comprising the steps of:
    (a) providing a substrate;
    (b) providing a first electrode over the substrate;
    (c) coating the first electrode with aqueous dispersed material which when dried provides a dielectric layer over the first electrode;

(d) coating the dielectric layer with liquid crystal bearing material and drying such liquid crystal bearing material to obtain a light modulating layer; and (e) providing a second electrode in contact with the dried liquid crystal bearing material;

wherein the dielectric layer is capable of providing effective insulation between the first and second electrodes to prevent image defects.

2. The method of claim 1 wherein the second electrode is provided by coating a conductive material on the liquid crystal bearing material so that voids in the liquid crystal coating are filled with the conductive material which engages the dielectric layer and does not provide an electrical short to the first electrode.

3. The method of claim 1 wherein the second electrode is provided on a second substrate which is bonded to the liquid crystal bearing material.

4. The method of claim 1 wherein the liquid crystal material is cholesteric liquid crystal material.

5. The method of claim 4 wherein the cholesteric liquid crystal material is provided in a polymeric binder to provide spaced domains of cholesteric liquid crystal material.

6. The method of claim 5 wherein the binder is gelatin.

7. The display of claim 1 wherein the liquid crystal material is cholesteric liquid crystal material.

8. The method of claim 1 wherein the liquid crystal bearing material bearing material comprises polymer-dispersed cholesteric liquid crystals in spaced domains capable of showing two stable states, a planar state and a focal conic state.

9. A liquid crystal display, comprising:

(a) a substrate;

(b) a first electrode over the substrate;

(c) aqueous dispersed material dried to provide a dielectric layer over the first electrode;

(d) dried polymer dispersed liquid crystal bearing material; and (e) a second electrode in contact with the dried liquid crystal bearing material;

wherein the dielectric layer is capable of providing effective insulation between the first and second electrodes to prevent image defects.

10. The display of claim 9 whereon the second electrode is provided by coating a conductive material on the liquid crystal bearing material so that voids in the liquid crystal coating are filled with the conductive material to engage the dielectric layer and not provide an electrical short to the first electrode.

11. The display of claim 9 wherein the second electrode is provided on a second substrate and is bonded to the dried polymer dispersed liquid crystal bearing material.

12. The display of claim 9 wherein the dried polymer-dispersed liquid crystal material comprises cholesteric liquid crystal in spaced domains capable of showing two stable states, a planar state and a focal conic state.

13. A liquid crystal display, comprising:

(a) a substrate;

(b) a first electrode over the substrate;

(c) aqueous dispersed material dried to provide either a dielectric layer over the first electrode or over the second electrode or over both electrodes;

(d) dried polymer dispersed liquid crystal bearing material; and (e) a second electrode in contact with the dried liquid crystal bearing material;

wherein said dielectric layer is capable of providing effective insulation between the first and second electrodes to prevent image defects.

14. The display of claim 13 wherein the dried polymer-dispersed liquid crystal material comprises cholesteric liquid crystal in spaced domains capable of showing two stable states, a planar state and a focal conic state.

* * * * *